United States Patent
Link et al.

(10) Patent No.: US 11,222,322 B2
(45) Date of Patent: Jan. 11, 2022

(54) POINTS-BASED PAYMENT SYSTEM

(71) Applicant: Verrency Holdings Limited, Singapore (SG)

(72) Inventors: David Cruzen Link, Sandringham (AU); Euan Duncan Walker, Sandringham (AU); Stephen John Cummins, Bulimba (AU)

(73) Assignee: VERRENCY HOLDINGS LTD., Singapore (SG)

( * ) Notice: Subject to any disclaimer, the term of this patent is extended or adjusted under 35 U.S.C. 154(b) by 483 days.

(21) Appl. No.: 15/490,095

(22) Filed: Apr. 18, 2017

(65) Prior Publication Data

US 2018/0300705 A1 Oct. 18, 2018

(51) Int. Cl.
*G06Q 20/20* (2012.01)
*G06Q 30/02* (2012.01)
(Continued)

(52) U.S. Cl.
CPC ........... *G06Q 20/204* (2013.01); *G06Q 20/24* (2013.01); *G06Q 20/387* (2013.01);
(Continued)

(58) Field of Classification Search
CPC ............. G06Q 20/0204; G06Q 20/387; G06Q 30/0226; G06Q 20/24; G06Q 20/405;
(Continued)

(56) References Cited

U.S. PATENT DOCUMENTS

2005/0251446 A1 11/2005 Jiang et al.
2007/0266059 A1 11/2007 Kitamura
(Continued)

FOREIGN PATENT DOCUMENTS

| CN | 104318296 | 1/2015 | |
|---|---|---|---|
| WO | WO-2006018856 A2 * | 2/2006 | ........... G06Q 20/387 |
| WO | WO2010051602 | 5/2010 | |

OTHER PUBLICATIONS

Chase pay to galvanise US bank mobile wallet market. (Apr. 14, 2016). World Market Intelligence News [Internet] [Retrieved on Aug. 25, 2021] Retrieved from URL: <https://dialog.proquest.com/professional/docview/1781030745?accountid=131444>. (Year: 2016).*

(Continued)

*Primary Examiner* — Abhishek Vyas
*Assistant Examiner* — Monica A Mandel
(74) *Attorney, Agent, or Firm* — K&L Gates LLP

(57) ABSTRACT

Payment systems allowing credit and/or points to fund financial transactions are provided. In one example, a payment system comprises a credit device issued to a consumer enabling the consumer to purchase products or services from a plurality of merchants using funds from a credit account associated with the consumer. The payment system comprises a payment network enabling the plurality of merchants to receive payment from an issuer that issues the credit device to the consumer. A funding device is configured to access information regarding credit available from the credit account, the funding device further configured to access information regarding points available to the consumer. The funding device is configured to use pre-established rules to determine the use of available credit and available points for completing a transaction with a first merchant of the plurality of merchants. The transaction appears to the first merchant as a regular credit card transaction.

22 Claims, 3 Drawing Sheets

(51) Int. Cl.
   *G06Q 20/24* (2012.01)
   *G06Q 20/40* (2012.01)
   *G06Q 20/38* (2012.01)
(52) U.S. Cl.
   CPC ....... *G06Q 20/405* (2013.01); *G06Q 30/0226* (2013.01); *G06Q 30/0215* (2013.01)
(58) Field of Classification Search
   CPC ........... G06Q 20/0207; G06Q 30/0229; G06Q 20/0237; G06Q 30/0238
   See application file for complete search history.

(56) References Cited

U.S. PATENT DOCUMENTS

| | | | | |
|---|---|---|---|---|
| 2008/0133350 | A1* | 6/2008 | White | G06Q 20/06 705/14.27 |
| 2009/0106112 | A1* | 4/2009 | Dalmia | G06Q 20/04 705/14.17 |
| 2010/0211469 | A1 | 8/2010 | Salmon et al. | |
| 2011/0010238 | A1* | 1/2011 | Postrel | G06Q 30/0229 705/14.38 |
| 2011/0087592 | A1 | 4/2011 | Van Der Veen et al. | |
| 2011/0295745 | A1* | 12/2011 | White | G06Q 20/108 705/42 |
| 2012/0041810 | A1 | 2/2012 | Hofer | |
| 2012/0253913 | A1* | 10/2012 | Richard | G06Q 20/363 705/14.27 |
| 2015/0149271 | A1* | 5/2015 | Battle | G06Q 30/0233 705/14.33 |
| 2016/0210605 | A1 | 7/2016 | Vaish et al. | |
| 2016/0210626 | A1* | 7/2016 | Ortiz | G06Q 20/023 |

OTHER PUBLICATIONS

Extended Search Report issued for European Patent Application No. 17906645.1 dated Dec. 17, 2020.
PCT Search Report and Written Opinion dated Dec. 11, 2012 issued for International PCT Application No. PCT/IB2017/000546.

* cited by examiner

POINTS-BASED PAYMENT SYSTEM

BACKGROUND

1. Field of the Invention

The present disclosure generally relates to financial services, and more particularly relates to payment systems for settling financial transactions.

2. Description of the Related Art

Plastic payment cards, such as credit cards, were introduced in the United States in the late 1940s as a way for a bank's most trusted customers to pay for meals and travel without carrying large amounts of cash. Since then, billions of payment cards have been issued by tens of thousands of banks.

Over the years, the payment card industry has developed various devices and processes to prevent fraud and to control the way that credit cards and other payment cards are used. Merchants adhere to various protocols to allow transactions to be conducted using credit cards, debit cards, microchip-embedded cards (e.g., EMV cards or smart cards), NFC-enabled cards, proxy cards, and other related payment devices. A consortium of card issuing networks created EMVCo, named for EuroPay, MasterCard, and Visa, which are the original founders of the organization. The consortium now also includes American Express, Discover, JCB, and Union Pay as equity partners.

In addition to regular credit accounts, many banks have created loyalty programs to encourage consumers to continue to use their cards. At present, there are many different types of loyalty programs. However, these loyalty programs are typically limited in the ways that consumers can be compensated for using the cards. For example, a consumer might receive cash back, rewards, points, or may be rewarded in other ways. With reward points, the financial institutions normally limit how a user can apply the points, such as by providing a limited selection of products or vouchers from a particular catalog related to the bank's partner merchants. Also, a retrospective use of points can be used to provide credit for a purchase that has already been made. The user may also be limited in the use of points only at a point-of-sale (POS) with a specific merchant, where the POS terminal has been altered to allow payment with points. Furthermore, the user may be limited by conventional loyalty programs in that points are used to replace cash only when purchasing goods from a specific merchant (typically the issuer of the points) on their own website.

Therefore, a need exists for a financial system that includes a loyalty program with fewer limitations and restrictions. Such an unrestricted system would be a desirable service for many consumers and may attract more consumers to use the program described in the present disclosure. With a more universal loyalty program, credit card issuers and banks may be able obtain and keep more satisfied consumers.

SUMMARY

The present disclosure describes systems and methods for conducting financial transactions. In particular, payment systems are described herein allowing transactions to be conducted such that funding is received from both a credit balance and a points balance. These transactions may be conducted with any merchant, since they appear to the merchants as regular credit card payments.

In one exemplary embodiments, a payment system comprises a credit device issued to a consumer to enable the consumer to purchase products or services from a plurality of merchants using funds from a credit account associated with the consumer. The payment system further comprises a payment network enabling the plurality of merchants to receive payment from an issuer that issues the credit device to the consumer. In addition, the payment system comprises a funding device configured to access information regarding credit available from the credit account, the funding device further configured to access information regarding points available to the consumer. The funding device is configured to use pre-established rules to determine the use of available credit and available points for completing a transaction with a first merchant of the plurality of merchants. Also, the transaction appears to the first merchant as a regular credit card transaction.

According to another exemplary embodiment, a transaction management system is provided. The transaction management system in this embodiment comprises a credit processor configured to manage and store information regarding credit available to a consumer and a points processor configured to manage and store information regarding points available to the consumer. The transaction management system further includes a funding device configured to access information regarding the available credit and available points. The funding device is configured to apply usage rules to determine the use of available credit and available points for completing a financial transaction between a merchant and the consumer. The use of available points during the financial transaction appears to the merchant as a regular credit card transaction.

In yet another embodiment, the present disclosure provides a method comprising a step of, during a financial transaction, obtaining information regarding an account associated with a consumer. The method also includes the step of deducting points and/or credit from the account based on pre-established usage rules regarding the use of points and credit to fund the financial transaction. Also, the method includes providing payment to a merchant offering products and/or services to the consumer during the financial transaction such that the financial transaction appears to the merchant as a regular credit card transaction.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF DRAWINGS

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

Figure 1:
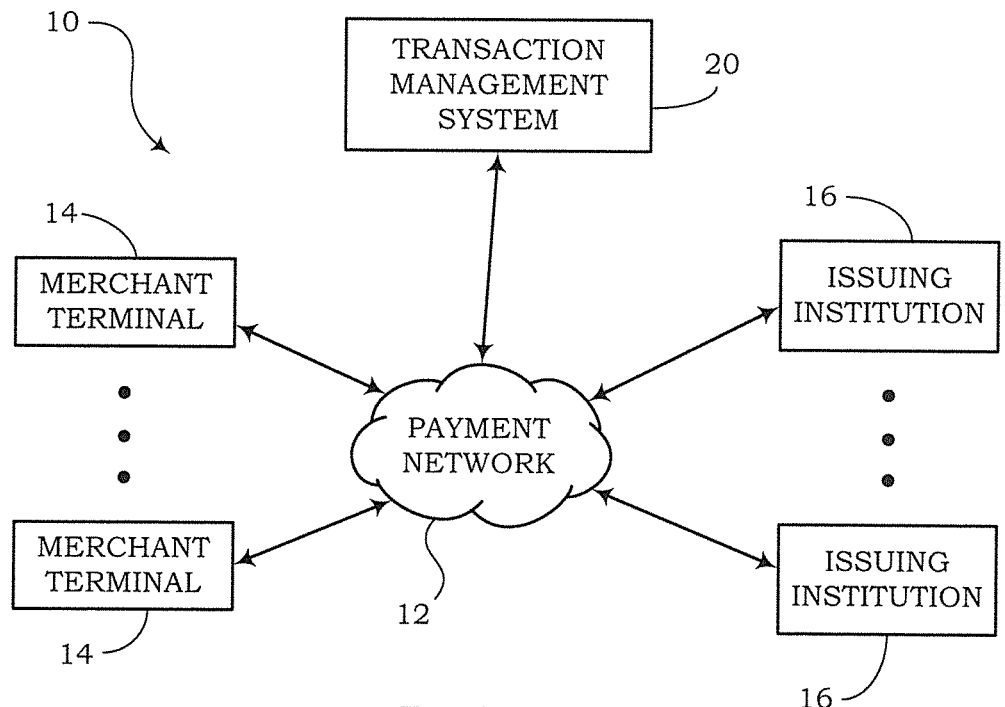
FIG. 1 depicts a block diagram of a payment system according to an embodiment of the present invention.

The present invention is directed to payment devices, such as, for example, plastic payment cards, virtual cards, wearable commerce devices, components embedded in mobile devices, applications running on mobile devices or computers, and other payment credentials. The present invention is also directed to systems and methods for conducting financial transactions using the payment devices. The present invention may include a commercially viable computing service, mobile application, and web site and may be implemented in conjunction with an issuing institution using payment cards or other payment devices as described herein.

The present invention introduces novel features associated with the use of existing payment devices. The present invention may include the management of credit and/or points used for making purchases. In the present disclosure, the term "points" or "loyalty points" may be defined as any type of non-fiat currency representation having some value for making a purchase in lieu of money. In some cases, the "points" may include some stored value, such as bitcoin, foreign currencies, etc. In some embodiments, the non-fiat currency representation does not have any intrinsic value and is not a commodity. The credit and/or points may be related to a loyalty program in which financial transactions can be conducted anywhere payment devices are accepted and wherein "points" or other type of non-fiat currency can be applied to fully or partially fund the transaction. The use of points or other non-fiat value representations for making these payments can be done without any actions on the part of the merchants. Therefore, points may be applied to purchases at any businesses, not merely those businesses that are part of a select group controlled by typical loyalty programs.

The present invention may be applied in a universal manner to allow any merchant, which is already set up to conduct transactions using a valid credential, to receive payment for products and services. Although the merchants are reimbursed by the issuing institutions in a real financial exchange, the issuing institutions may allow payment from the consumer using regular credit and/or using points available in this novel loyalty program. The term "valid credential" is used herein to represent a valid funding instrument, which may be, but is not limited to, a credit card, charge card, debit card, direct deposit account, savings account, checking account, loyalty card, virtual card, gift card, proxy card, Internet of things (IoT) device, components and/or applications embedded in mobile devices, or other cards or devices.

The valid credentials described in the present disclosure may be multimodal payment devices, which can be used in various modes for different types of financial transactions. Some modes may include those involving a microchip embedded in the device, those involving near field communication (NFC) components, those involving a magnetic stripe, those involving entering the device number and card verification value (CVV) in an online transaction, and/or other modes.

FIG. 1 is a block diagram illustrating an embodiment of a payment system 10 in which payments can be made using any combination of points and credit. The payment system 10 includes a payment network 12, which may include wired and wireless infrastructures for enabling communication between various nodes in the payment system 10. A plurality of merchant terminals 14 are configured in communication with the payment network 12. The merchant terminals 14 may include point-of-sale (POS) terminals, online purchasing nodes, product/service call centers, etc., for accepting payment from a consumer in exchange for a product or service. Normally, merchant terminals 14 in this arrangement are incapable of communicating with each other. Instead, the merchant terminals 14 may communicate with one or more issuing institutions 16.

The issuing institutions 16 may include banks, credit card issuing companies, or other financial institutions that issue a credit card, payment card, debit card, proxy card, or other credential mechanism used for making a purchase. The issuing institutions 16 may issue payment devices, such as credit cards or other payment cards to various consumers. In some embodiments, the user may use another type of proxy credential other than a payment card, such as a mobile device. The issuing institutions 16 may include servers, web servers, software running on servers, hardware appliances, or any suitable intermediary computing devices for providing various transaction services.

The merchant terminals 14 may include POS terminals or other nodes used at a number of business establishments. In fact, the merchant terminals 14 may represent all merchants capable of requesting approval of the use of a customer's credit card for a purchase, which of course includes a wide breadth of merchants. The issuing institutions 16 may represent all major credit card companies that have agreements with the merchants. For example, the major credit card companies may include at least Visa™, MasterCard™, American Express™, Discover™, and others.

The term "merchant terminal" is used to describe a physical terminal, website, or other devices for providing functionality by a merchant at which a payment is originated. Merchant terminals can be embedded in POS equipment and can be "virtual" as in ecommerce website processing. Also, merchant terminals can be background devices where no device, card, customer, merchant, or goods are involved, such as when recurring payments are initiated for services. The "merchant terminal" may represent POS devices, merchant online systems, and other mechanisms owned/controlled by the merchant to conduct various modes of purchase. The merchant terminals may include any merchant systems used in different payment modes using one or more types of technologies (e.g., EMV chip, magnetic stripe, NFC, e-commerce, etc.).

The payment network 12 may include a wide area network, the Internet, private networks, and/or other publicly accessible networks. Also, the payment network 12 may include local area networks associated with various merchants. The payment network 12 may be a private network, local area network, a virtual private network (VPN), or a public network with a high level of encryption. The payment network 12 may also be in communication with one or more cellular networks in communication with cellular antennas and/or satellites. The merchant terminals 14 and issuing institutions 16 may be connected by one or more wired or wireless connections to the payment network 12 to enable electronic communication between any merchant terminal 14 and respective issuing institutions 16 representing the merchants 14.

During a purchasing operation, the user to whom a payment device has been issued may use the payment device as payment for merchandise or services. The payment device can be presented to a merchant at one of the merchant terminals 14. It should be noted that several merchant terminals 14 may be associated with the same merchant for obtaining account information through various modes. In fact, multiple merchant terminals 14 may be associated with a single device used by a merchant for obtaining information at a single POS device.

Accordingly, the POS device may obtain information from the payment device by a first mode utilizing a microchip embedded in the device or by additional modes, which may involve the use of the NFC components or magnetic stripe on the device. In other transactions, such as online or telephone transactions, the device number printed and/or embossed on the device may be entered electronically or by an order-taking representative of the merchant. An alternative embodiment may include the payment system 10 in which a credit card or other credential mechanism is devoid of a printed and/or embossed account number. Also, the payment device may be devoid of a magnetic stripe, or one of the other modes. In this case, the user may use the payment device at a merchant terminal using only the microchip and/or NFC components, or the modes remaining on the device.

According to alternative embodiments, the payment system 10 may instead be configured as a system for performing non-payment actions. Instead of conducting various functions related to financial accounts as disclosed herein, the non-payment system may process other types of credentials for entities other than issuing institutions.

During a typical credit card transaction, a card is read by the merchant terminal 14 and information regarding the credit card number and purchase amount is transmitted to the respective issuing institution 16 via the payment network 12. The issuing institution 16 immediately checks the credit balance associated with the credit card and determines if the available credit afforded to the user at the time of purchase is sufficient to cover the cost of the items or services to be purchased. If so, the issuing institution 16 sends a message back to the respective merchant terminal 14 to indicate that the purchase has been approved. However, if the available credit is insufficient to cover the cost, the issuing institution 16 returns a message indicating the account has insufficient funds and the purchase is rejected.

Thus, the above description defines a typical purchasing arrangement for using a credit card at any merchant 14 equipped to handle credit card payments with one or more issuing institutions 16. In addition to the conventional purchasing system described above, the payment system 10, according to various embodiments of the present invention, further includes a transaction management system 20. The transaction management system 20 may be associated with one particular credit card company, one issuing institution 16, or even a group of issuing institutions 16 in some embodiments. Instead of basing an approval or rejection of a purchase solely on credit availability, the transaction management system 20 may further base a potential purchase on a combination of available credit and points (e.g., loyalty points or other non-fiat currency representations).

Typically, loyalty programs are limited in several ways, as mentioned above. The numerous types of loyalty programs in use today usually limit the customer to products that are pre-selected by the loyalty programs. Sometimes the customer is limited to selecting from a catalog, which, of course, is limited to just the items in that catalog. Points may be used in some programs to purchase items from a specific merchant using the merchant's own website. In some situations, the customer may retrospectively use points to provide a credit for a purchase already made. Some loyalty programs limit the use of points at only specific POS terminals where specific merchants are part of an approved group. In this case, the POS terminals may have been specifically designed or modified to allow payment with points. Nevertheless, it should be noted that these programs are limited to only certain products and/or only certain merchants. It does not allow a customer to go outside this network of merchants to purchase any items using these points.

However, beyond the scope of conventional loyalty programs, the transaction management system 20 of the payment system 10 allows a consumer to purchase items from an unlimited number of merchants 14 for an unlimited number of products or services. Therefore, the payment system 10 of the present invention does not restrict a consumer regarding how points are applied. The transaction management system 20 allows a customer to utilize points or other non-fiat currency representation of one or more loyalty points programs on any purchase where credit cards or other similar credential mechanisms are accepted.

The transaction management system 20 is unique in that it allows loyalty points of all sorts to be used to fund part, or all, of any transaction at any merchant terminal 14 connected in the payment network 12. The transaction management system 20 includes novelty in that points can be used anywhere an existing card payment can be received, without modification of the merchant terminal 14. Also, in some embodiments, a proxy card can be used in place of a credit card or the like to access the points. Therefore, the points associated with the loyalty program associated with the transaction management system 20 can be used to fund transactions in real time, rather than requiring the consumer to use an e-commerce site.

In addition, the transaction management system 20 may be configured to include rules for how the points and credit are used for making purchases. In some embodiments, the decisions for establishing the usage rules may be made by the consumers prior to conducting transactions. Also, the consumer is also allowed to determine how to use points and/or credit at the merchant terminal 14 itself, allowing real time decisions regarding points usage.

According to the embodiment of FIG. 1, the issuing institution 16 may provide a consumer with a specific payment device, such as a specific credit card, a proxy device, or other payment credential. The proxy card in this example may operate like a typical credit card, but may be configured differently in some ways. The payment device may include elements similar to a credit card, such as a magnetic strip, a microchip, a displayed account number, etc., to allow the input of the credit account and/or points account with the merchant terminal 14.

The usage rules for determining how points and/or credit are used for making a purchase can be pre-established by the issuing institution 16 and/or by the consumer. The rules may define various aspects of purchases, such as the type of transactions to which points might be applied. The consumer may select if all transactions or certain classes of transactions are to be funded by the available points. The consumer may even select specific transactions for certain items or for any items purchased from specific merchants. These selections can be made through the transaction management system 20, as described in more detail below.

Figure 2:
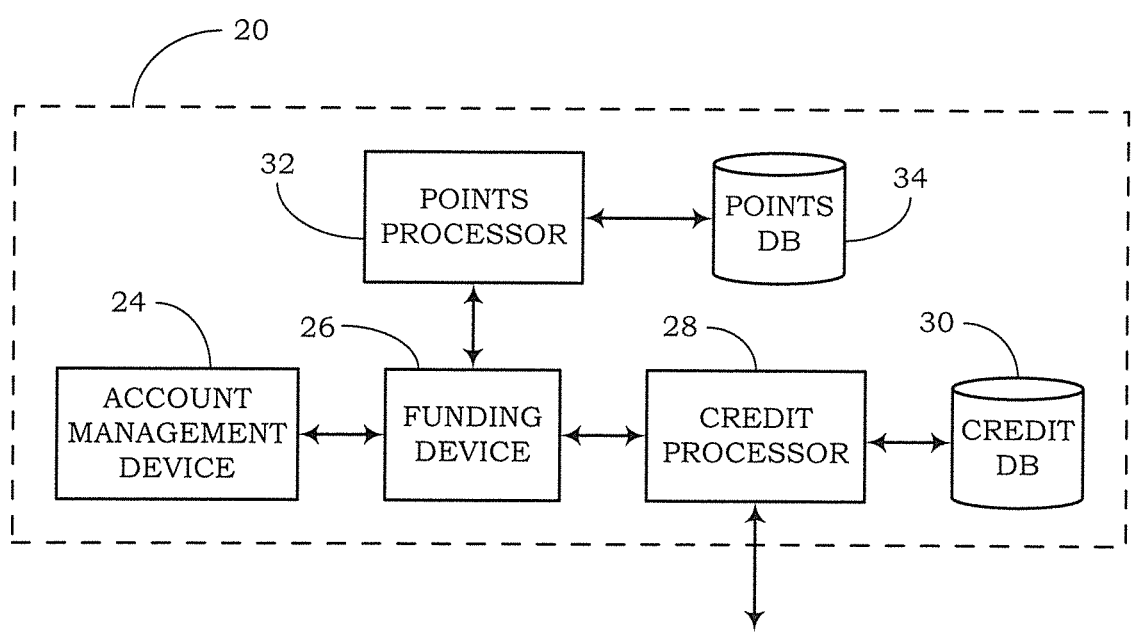
FIG. 2 depicts a block diagram of the transaction management system shown in FIG. 1, according to an embodiment of the present invention.

FIG. 2 is a block diagram illustrating an embodiment of the transaction management system 20. In the embodiment of FIG. 2, the transaction management system 20 includes an account management device 24, a funding device 26, a credit processor 28, a credit database 30, a points processor 32, and a points database 34. The transaction management system 20 may be configured to accommodate communication with multiple users (e.g., consumers) and with multiple merchants 14. In some embodiments, the transaction management system 20 may also be configured to communicate with multiple issuing institutions 16.

The transaction management system 20 may include one or more computer systems, processors, microprocessors, or other computing devices for managing the accounts associated with loyalty points for each of a plurality of consumers. In some embodiments, the transaction management system 20 may be configured as a single computer system or server operating at a single location. In other embodiments, the transaction management system 20 may include multiple processing devices that may be located at a single facility or in multiple locations.

Furthermore, it should be noted that each of the account management device 24, funding device 26, credit processor 28, and points processor 32 may include one or more processing devices or systems operating at one or more locations in the payment network 12. Each of the devices and processors 24, 26, 28, 32 may include any combination of hardware, software, and firmware for performing various functions of the transaction management system 20, which collectively is able to control the operations of managing both a credit account and a points account associated with a user. It should further be noted that the transaction management system 20 may perform the various actions for any number of users (e.g., consumers) having any number of accounts from any of the issuing institutions 16.

Generally, the account management device 24 enables a user (e.g., consumer) to access information regarding the points available to the user, the monetary value of these points with respect to any merchant, etc. Also, the account management device 24 may include information defining the terms of agreement for use of the loyalty program and other information describing how the loyalty program works.

A more significant feature of the account management device 24 is that it allows the user, under certain conditions, to establish how points are to be applied to future purchases. A user may wish that the points are only used at certain types of establishments (e.g., restaurants, gas stations, etc.). Also, the user may determine how many or what percentage of the points are used in certain situations. For example, the user may wish that as many points as available are used first and then credit is used to rectify the purchase if the available points are insufficient to completely cover the costs of the purchase. Other various scenarios and conditions may be configurable. In some cases, certain restrictions may apply to how the usage rules are established and may be determined by the issuing institution.

It should be noted that the account management device 24 may be accessible to the user by various methods. The account management device 24 may be a website or other Internet banking platform that the user can access to enter the usage rules. Alternatively, the account management device 24 may be a call center that the user can call to enter the rules through an operator at the call center. Also, the account management device 24 may include a mobile network protocol allowing a user to enter rules via a smart phone or other mobile device.

The funding device 26 is a central component in the transaction management system 20 for gathering information from the other components to determine how to fund a certain purchase for a certain user and also to determine if available credit and/or points are sufficient to make the purchase. The funding device 26 obtains the available points for the specific user from the points processor 32. Also, the funding device 26 obtains the available credit and the pending purchase cost from the credit processor 28. Furthermore, the funding device 26 obtains the usage rules from the account management device 24.

With this information, the funding device 26 calculates if the purchase can be made according to the usage rules. If not, the funding device 26 communicates an error to the credit processor 28, which then sends a message back to the merchant terminal 14 that the funds are insufficient to make the purchase. If the credit and/or points are sufficient to cover the cost of the purchase, the funding device 26 communicates to the points processor 32 to deduct the appropriate number of points from the user's points account in the points database 34. Also, the funding device 26 communicates to the credit processor 28 to deduct the appropriate credit from the user's credit account in the credit database 30. The funding device 26 or credit processor 28 may include a settlement account associated with the loyalty points program that can be updated as needed. For example, such a settlement account may control the transfer of money to settle the respective accounts in a batch mode where multiple settlements are conducted in a batch and/or in real-time mode where accounts are settled during each transaction.

The points database 34 may include one or more files and/or application programming interfaces (APIs) stored as batch update files and/or in real time. In some embodiments, another database may be configured in the transaction management system 20 to record information other than credit and points. For example, consumer information, such as names, addresses, phone numbers, credit scores, etc. may be stored in the databases 30, 34 as needed.

The credit processor 28 is configured to access the secured credit database 30 that stores the credit amounts for a plurality of credit accounts belonging to a plurality of consumers. The credit processor 28 receives the purchase request from the merchant terminal 14 via the payment network 12 and communicates the request to the funding device 26, which then processes the request to determine if the available credit and/or points are sufficient to cover the requested purchase.

The points processor 32 is configured to access the secured points database 34 that stores the point totals for each of a plurality of loyalty accounts belonging to a plurality of consumers. The points processor 32 works with the funding device 26 to communicate the available points for a particular consumer and then deducts the points that are used for various purchases as dictated by the funding device 26.

Figure 3:
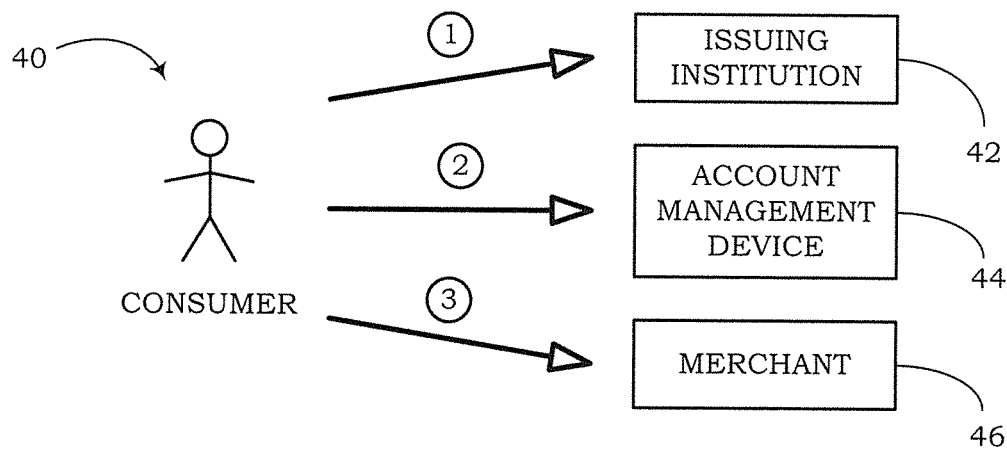
FIG. 3 depicts a diagram of interactions between a consumer and other players in the payment system, according to an embodiment of the present invention.

FIG. 3 is a diagram illustrating the various ways that a consumer 40 performs actions with various players in the payment network 12. For example, in a first interaction, the consumer 40 communicates with the issuing institutions 42 to apply for a credit card or loyalty program. Also, the consumer 40 can make payments for the purpose of paying down or paying off debts to the issuing institution 42 from previous purchases made on credit. This interaction may include the consumer 40 sending a bank check to the issuing institution 42, using an online banking website associated with the issuing institution 42 to make a payment, calling a call center to make a payment, or other suitable method for making payments.

A second interaction includes the consumer 40 working with an account management device 44 (e.g., the account management device 24 of the transaction management system 20 shown in FIG. 2). This interaction includes the entry of usage rules, as described above, for establishing how the credit and/or points are to be applied to future purchases. In some embodiments, the consumer 40 may alter the usage rules with the account management device 44 at the point of purchase. In this manner, the rules, under certain conditions, may be changed while the consumer 40 is making a purchase. The changes to the usage rules may be made via a smart phone connection to the account management device 44 via a mobile network, or in other cases may be made through the merchant terminal 14, if it is so equipped.

The third interaction is the interaction between the consumer 40 and the merchant 46. The merchant 46 may be associated with one or more of the merchant terminals 14 shown in FIG. 1. The consumer 40 may present a credit card or other credential mechanism to the merchant 46 for paying for a purchase. In some cases, the credit card may be swiped in a card reading device of a POS terminal or inserted into a device of the POS terminal for reading a microchip on the card. Also, card numbers may be manually entered, a NFC device may communicate with the card, or other methods may be used for accessing the consumer's credit/loyalty account.

Figure 4:
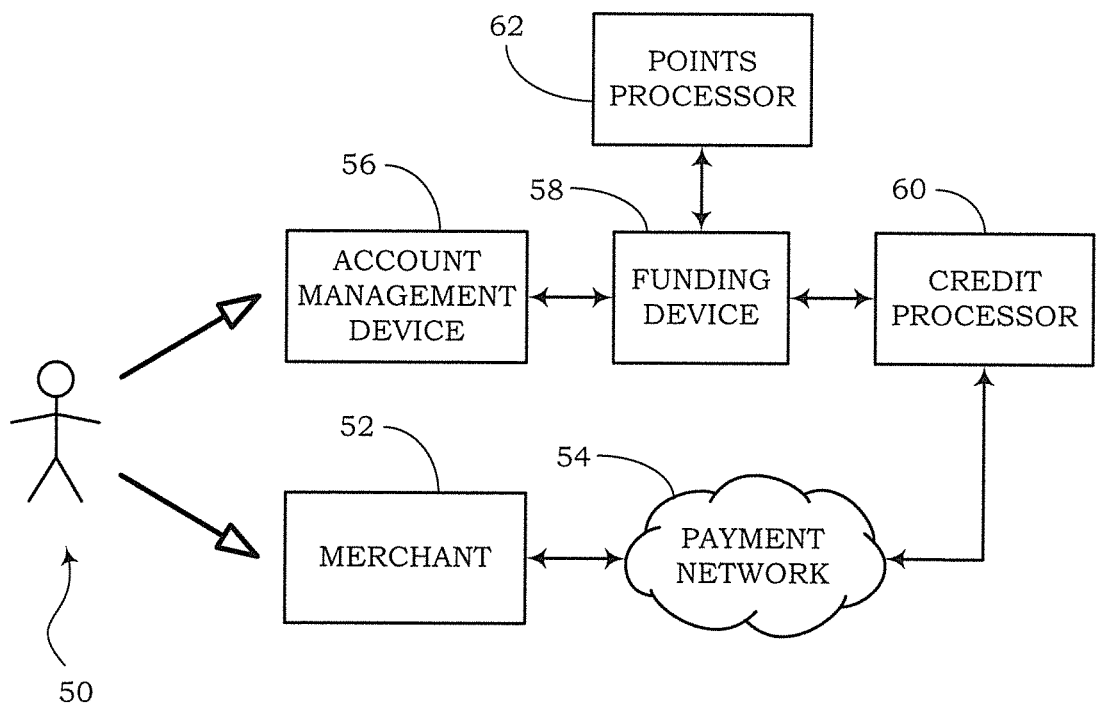
FIGS. 4-6 depict diagrams of various payment system configurations according to various embodiments of the present invention.

FIG. 4 is a block diagram illustrating an embodiment of the use of a payment system. A consumer 50 may interact with an account management device 56, which may be associated with the account management device 24 of the transaction management system 20. The account management device 56 may include software or firmware running on a computing device, machine, or other suitable system, to allow the consumer 50 to establish usage rules for defining how credit and/or points are applied to purchases. Also, the consumer 50 interacts with a merchant 52 to initiate a payment process according to the teachings described in the present disclosure.

During a purchase, the merchant 52 communicates the consumer's credentials (e.g., credit card account number) to the credit processor 60 via the payment network 54. The funding device 58 receives the purchase details and available monetary credit from the credit processor 60 and receives the available points from a points processor 62 associated with a loyalty program. Also, the funding device 58 receives usage rules from the account management device 56. In some instances, the account management device 56 may provide real time usage rules if the consumer 50 decides to alter the rules at the point of purchase.

The funding device 58 obtains four pieces of information: the available credit, the available points, the purchase amount, and the usage rules. From these four elements, the funding device 58 performs two main actions. First, the funding device 58 determines if the available credit and/or points are sufficient to cover the purchase amount based on the usage rules. If the funding device 58 determines that the purchase is acceptable considering the usage rules, the purchase is allowed to proceed and the funding device 58 signals to the merchant 52 via the credit processor 60 and payment network 54 that the purchase is approved. It should be noted that the merchant 52 may be unaware of the actions of the funding device 58 and may be unaware that the approval may be partially or wholly based on points instead of credit. However, since the merchant 52 will receive payment for the purchase from a settlement account, these details may not be of concern to the merchant 52.

The second action of the funding device 58 is an operation in response to the determination of approval or disapproval of the purchase. If the purchase is approved, the funding device 58 notifies the merchant 52 that the purchase is approved. If not, the funding device 58 notifies the merchant 52 that the purchase is not approved, such as, for example, on the grounds of insufficient funds. If approved, the funding device 58 notifies the credit processor 60 that a certain amount of credit, if any, should be deducted from the consumer's account. The funding device 58 also notifies the points processor 62 that a certain number of points, if any, should be deducted from the consumer's points account related to the loyalty program when the purchase is approved. In lieu of points, other non-fiat currency values, such as bitcoin or foreign currencies, may be deducted from an account.

Prior to processing a transaction, an issuer (e.g., issuing institution 16 shown in FIG. 1) may verify the value available to fund a transaction from the loyalty program's points processor 62. This verification will be done directly or via the funding device 58. At the merchant 52, a user would make a payment using their credit card or proxy card, as per normal purchasing processes, and information related to the transaction would be forwarded to the credit processor 60. Therefore, there is no interaction between the merchant 52 and the loyalty program (i.e., points processor 62). The merchant 52 is not required to take any special actions regarding points or to use any special merchant devices other than a typical merchant terminal or POS terminal as is used for normal transactions.

If the consumer 50 has selected to fund a transaction using points, the funding device 58 will check the value of the loyalty points available from the points processor 62. If sufficient to cover the cost of the transaction, then the points value will be reduced, and an approval will be sent to the merchant 52 as if the transaction had been fully funded from a regular payments account. A settlement processor, which may be part of the funding device 58 or credit processor 60, may be used to settle accounts when the purchase is approved. Settlement may be made in real-time or in a batch mode in which multiple settlements are conducted in a certain timeframe.

If the points value is insufficient to cover the cost of the transaction, the system will then perform one of several options, depending on the configuration or pre-established usage rules. First, the funding device 58 may reject the transaction returning an insufficient funds error. Alternatively, the funding device 58 may fund the entire transaction from an alternative funding source, such as a credit account. Another action may include funding the transaction with as many points as possible from the available points and then funding the balance of the transaction value from an alternative funding source. Of course, the alternative funding source may include the credit account managed by the credit processor 60. The funding device 58 is configured to use a pre-configured calculation for the conversion of loyalty points to a monetary value.

In some implementations related to FIG. 4, a customer could use an application, web site, call center, or other means to communicate with the account management device 56 to indicate that all transactions, transactions meeting specific criteria, or individual transactions are to be funded from a specific loyalty or points program. After the consumer 50 conducts a typical transaction using a standard payment instrument, the processing of the transaction proceeds according to normal procedures, which may include the procedures described in the present disclosure or even procedures of typical financial transaction. However, in this embodiment, a further series of actions is performed to alter the original transaction.

After a payment has been successfully completed, the transaction would be forwarded to the funding device 58, which will check the available value of the loyalty points, stored values, gift cards, or other funding sources. If the value of points and other sources are sufficient to cover some, or all, of the transaction cost, then the original transaction record will be altered or reversed, and a new record can be created to indicate the full or partial use of points to fund the transaction. Therefore, the system of FIG. 4 is configured to convert a transaction from one based solely on credit to one based on points and credit. This can be done without any action required by the consumer 50 or merchant 52, but instead is performed automatically in the background.

Figure 5:
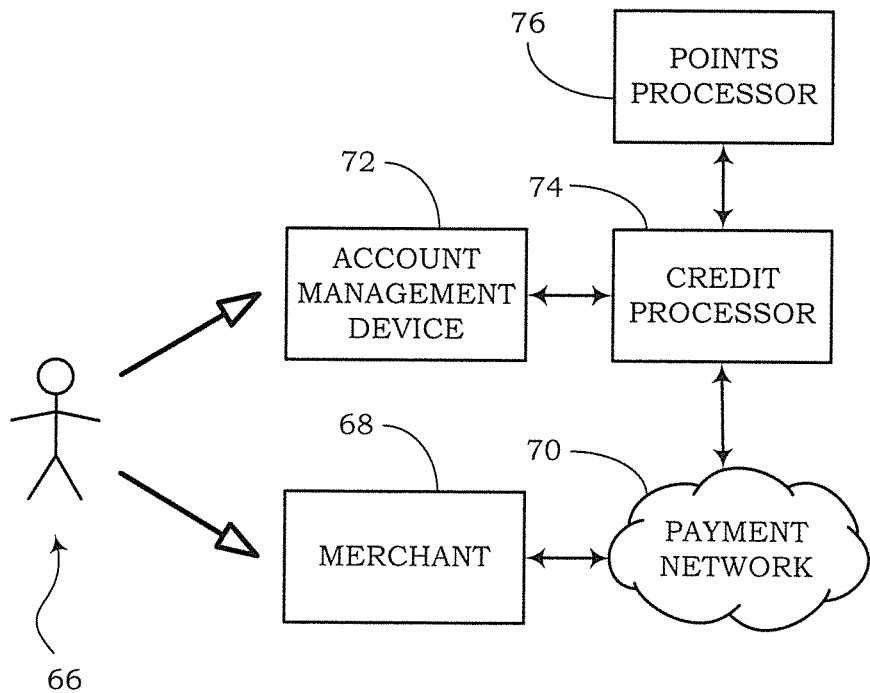

FIG. 5 is a diagram illustrating another payment arrangement similar to the arrangement shown in FIG. 4. The embodiment of FIG. 5 includes a consumer 66, merchant 68, payment network 70, account management device 72, credit processor 74, and points processor 76. In this embodiment, the funding device of FIG. 4 may be incorporated into the credit processor 74. Many of the same operations described above may be performed to allow financial transactions to be based on loyalty points, gift cards, or any combination of loyalty or rewards programs.

In one implementation, a customer could use an application, web site, call center, etc., to indicate that a transaction, all transaction, or transactions meeting specific criteria, are to be funded from a specific loyalty or points program. The customer would make a payment using a standard payment instrument, with the payment being sent to the payment issuer per the normal method, whereupon the issuer, via the credit processor 74, will check the available value of the loyalty points, stored values, gift card values, or other funding sources.

If sufficient to cover the cost of the transaction, then the points value will be reduced, and an approval will be sent to the merchant 68 as if the transaction had been fully funded from a regular payments account, and the value of the loyalty account reduced as appropriate.

If the points value is insufficient to cover the cost of the transaction, the credit processor 74 will then act in one of several ways, depending on configuration or pre-established usage rules communicated by the account management device 72. One way to act when it is determined that the points value is insufficient is to reject the transaction returning an insufficient funds error. Another action may include funding the entire transaction from an alternative funding source, such as a credit account. Lastly, the transaction can be funded with as many points as possible, and then the balance of the transaction value can be funded from an alternative funding source. In the second and third instances, the result to the merchant 68 would be as per a regular payment being funded.

In one implementation of the arrangement of FIG. 5, a customer could use an application, web site, call center, to indicate to the account management device 72 how points are to be applied. The consumer 66 may include that all transactions, transactions meeting specific criteria, or specific transactions are to be funded from a specific loyalty or points program managed by the points processor 76.

In some embodiments, the customer could make a payment using a standard payment instrument, with the payment being sent to the payment issuer for processing per the normal method. However, after the payment has been successfully completed, the credit processor 74 will check the available value of the loyalty points, stored values, gift cards, or other funding sources to see if the original transaction should be modified. Since the original transaction may already be completed, the consumer 66 and merchant 68 can go on without regard to the background operations of the credit processor 74.

Thus, if the credit processor 74 determines that the value of points or other rewards are sufficient to cover some, or all, of the original transaction cost, then the credit processor 74 alters or reverses the original transaction record and creates a new record. The new record will indicate that the transaction has been funded fully or partially through the use of points. The credit processor 74 may include a settlement module to settle the various accounts when the transactions are approved.

Figure 6:
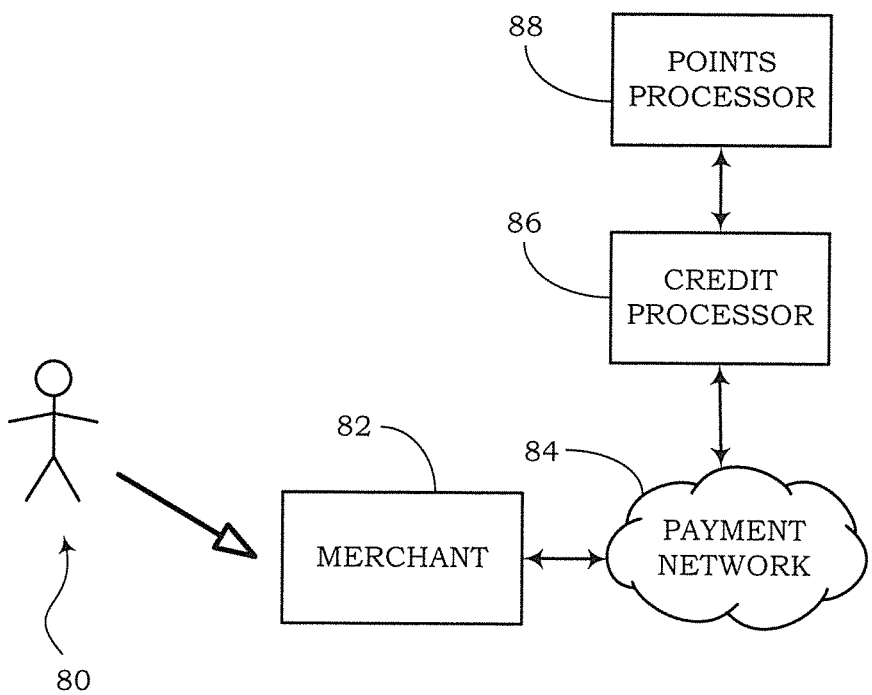

FIG. 6 is a block diagram illustrating another payment arrangement similar to the embodiments shown in FIGS. 4 and 5. In FIG. 6, the implementation includes a consumer 80, merchant 82, payment network 84, credit processor 86, and a points processor 88. This arrangement may include the incorporation of the functionality of the account management device 56, 72 into the credit processor 86. The credit processor 86 may be an issuing institution 16 or other credit managing system.

In one implementation, a customer (i.e., consumer 80) would be issued a standard payments instrument, such as a credit card, which was tied to a specific loyalty or points program. The customer would make a payment using the payment instrument, with the payment being sent to the payment issuer per the normal method, whereupon the credit processor 86 or issuer will check the available value of the loyalty points, stored values, gift cards, rewards, cash back bonuses, or other funding sources.

If sufficient to cover the cost of the transaction, then the points value will be reduced from the loyalty points account by the points processor 88, and an approval will be sent to the merchant 82 as if the transaction had been fully funded from a regular payments account. If the points are insufficient to cover the cost of the transaction, the system of FIG. 6 may, depending on various configurations or pre-established rules, 1) reject the transaction returning an insufficient funds error to the merchant 82, 2) fund the entire transaction from an alternative funding source (such as a credit account), or 3) fund the transaction with as many points as possible while funding the balance of the transaction value from an alternative funding source. In configurations 2 and 3, the result to the merchant 82 would be as per a regular payment being funded.

In another implementation of the arrangement of FIG. 6, the consumer 80 may be issued a payment device, such as a credit card, which was tied to a specific loyalty or points program. The customer would make a payment using the payment device, with the payment being sent to the payment issuer or credit processor 86 for processing per the normal method.

However, according to other embodiments, after payments have been successfully completed, the issuer or credit processor 86 will check the available points (or other rewards, values, funds, etc.) from the points processor 88. If the value of points is sufficient to cover some, or all, of the transaction cost, then the original transaction record will be altered or reversed, and a new record will be created to indicate the full or partial use of points to fund the transaction.

Therefore, in some implementations using the systems of FIGS. 4-6, a payment process based on points and/or credit may be conducted after a regular transaction is conducted. After processing the transaction as per typical payment practices, the issuer may verify the points value available, after the fact, to fund the transaction from a loyalty/points scheme of the loyalty program 62, 76, 88. This verification may be done directly or via funding device 58 or credit processor 74, 86.

If the user has selected to fund the transaction using points, the funding device 58 or credit processor 74, 86 can check the value of the loyalty points available from the loyalty program 62, 76, 88. If sufficient to cover the full or partial cost of the transaction, then the transaction can be reversed in the issuer's system and a new transaction is created. Although the first transaction may be complete, this original transaction is reversed and the new transaction, which may be based at least partially with points, is conducted. The net effect is the same and the merchant 52, 68, 82 would have a normal payment experience. Even the consumer 50, 66, 80 may be unaware of the new transaction being conducted. However, the consumer may check his or her account to see how the transaction was funded. The new transaction may be funded fully or partially with points of the loyalty program 62, 76, 88. Settlement of funds would be managed via a process agreed between the issuer and points/loyalty program. Multiple settlement processes may take place if a transaction is reversed and redone. In other embodiments, a single settlement process may be conducted after the transaction is reversed to simplify the account settling process.

The implementations described herein represent a number of possible implementations and examples and are not intended to necessarily limit the present disclosure to any specific implementations. Instead, various modifications can be made to these implementations as would be understood by one of ordinary skill in the art. Any such modifications are intended to be included within the spirit and scope of the present disclosure.

What is claimed is:

1. A payment system, comprising:
a payment network enabling a plurality of merchants to receive settlement payments from an issuer that issued a credit device to a consumer, the credit device allowing the consumer to make purchases from the plurality of merchants using funds from a credit account associated with the consumer;
a credit processor configured to manage and store information regarding credit available to the consumer from the credit account, the credit processor in communication with the merchants via the payment network;
a points processor configured to manage and store information regarding points that are available to the consumer, the points being a representation of a non-fiat currency; and
a funding device in communication with the credit processor and the points processor, the funding device configured
to access information regarding the credit available from the credit account by querying the credit processor,
to access information regarding points available to the consumer by querying the points processor,
to receive rules that were pre-selected by the consumer before the consumer begins a transaction with a first merchant of the plurality of merchants,
to use the rules to determine use of the available credit and the available points for completing the transaction with the first merchant, and
to determine whether the transaction is approved based at least on the available credit and the available points, and to communicate an approval to the credit processor when the transaction is approved;
the credit processor further configured, after receiving the approval from the funding device when the transaction is funded using points or a combination of credit and points, to communicate approval of the transaction to the first merchant with an approval message that is the same as an approval message used for a credit purchase via the payment network so that the transaction appears to the first merchant as a regular credit transaction when points or a combination of points and credit are used to pay for the transaction and the merchant is not informed that points were used to fund the transaction as part of the transaction approval, and
wherein the funding device is further configured, after the credit processor communicates approval of the transaction and the preselected rules indicate the transaction is to be completed with points or a combination of points and credit, and the points available to the consumer are sufficient to complete the transaction according the preselected rules, to cause the credit processor to alter or modify the regular credit transaction to create a new transaction where points available to the consumer are used for all or part of the new transaction.

2. The payment system of claim 1, wherein the first merchant is an unrestricted merchant that requires no action regarding the available points, requires no modification of a point-of-sale (POS) terminal, and requires no membership or network of preferential merchants.

3. The payment system of claim 1, wherein the credit account is associated with a loyalty points account, and the points are points from the loyalty points account.

4. The payment system of claim 1, further comprising an account management device configured to store the consumer pre-selected rules regarding the use of available credit and available points for completing transactions, the account management device in communication with the funding device and transmitting information indicative of the pre-selected rules to the funding device.

5. The payment system of claim 4, wherein the account management device receives input communicated from the consumer to pre-select the rules regarding the use of available credit and available points.

6. The payment system of claim 5, wherein the account management device is configured to receive the consumer input to select the rules using one of a smart phone, a computer, a telephone call center, and a mailed paper form.

7. The payment system of claim 4, wherein the pre-selected rules are applicable at various levels to account for all transactions, classes of transactions, or specific transactions.

8. The payment system of claim 1, wherein the credit device is one of a credit card, a payment card, and a proxy device.

9. The payment system of claim 1, wherein, if the pre-selected rules define a transaction as being paid by points when points are available and when the available points are insufficient to cover the entire costs of the transaction, the pre-selected rules further indicate at least one of: (a) a rejection of the transaction for insufficient funds, (b) a funding of the entire costs of the transaction by the credit available from the credit account, and (c) a partial funding of the transaction by points and a partial funding of the transaction by the credit available from the credit account.

10. The payment system of claim 1, wherein the payment network does not provide for the acceptance of points by the merchant for completing the transaction, the funding device being configured to cause the payment by points to be converted or modified into a payment by credit, as seen by the merchant.

11. A transaction management system comprising:
a credit processor configured to manage and store information regarding credit available to a consumer, the credit processor in communication with a merchant, and configured to receive information from the merchant related to an attempted credit transaction by the consumer, the attempted credit transaction being made without providing any indication to the merchant that points will be used in the transaction;
a points processor configured to manage and store information regarding points available to the consumer, the points representing a non-fiat currency; and
a funding device in communication with the credit processor and the points processor, the funding device configured
to receive information regarding the consumer's available credit from the credit processor and the consumer's available points from the points processor,
to receive information representative of rules pre-selected by the consumer prior to the attempted credit transaction being initiated by the consumer, the rules indicating how to allocate available points to transactions,
to apply the pre-selected rules to determine the use of available credit and available points for completing the attempted credit transaction between the merchant and the consumer,
to determine whether the transaction is approved based at least on the available credit and the available points,
to, responsive to the transaction being approved and according to the preselected rules, to cause available points to be used to partially fund the transaction, and
to, when a transaction is approved and partially funded with points, cause an approval message to be sent to the merchant that appears to the merchant as a regular credit transaction without the use of points, regardless of available points being used to at least partially fund the transaction so that the merchant is not informed that points were used to fund the transaction as part of the transaction approval,
wherein the funding device is configured, responsive to the approval and based on the consumer pre selected rule, to communicate with the points processor to deduct an appropriate number of points from the user's points account in a points database and to communicate with the credit processor to deduct an appropriate credit from the user's credit account in a credit database.

12. The transaction management system of claim 11, wherein the transaction is conducted at a merchant point-of-sale (POS) terminal and the funding device uses at least a portion of the available points without any action required on the part of the merchant beyond a normal credit transaction and without modification of a POS terminal associated with the merchant.

13. The transaction management system of claim 11, wherein the funding device is configured to determine whether the transaction is approved based at least on the available credit and the available points, and when the transaction is approved and the transaction is to be funded at least partially by points, the funding device causes an approval message to be sent to the merchant without indicating to the merchant that points have been used to fund the transaction.

14. The transaction management system of claim 11, further comprising an account management device, in communication with the funding device, configured to store the pre-selected rules regarding the use of available credit and available points for completing transactions.

15. The system of claim 11, wherein the funding device is configured to communicate in real time during a transaction with the credit processor to deduct credit and the points processor to deduct points.

16. The system of claim 11, wherein the funding device is configured to communicate in a batch mode for multiple transactions with the credit processor to deduct credit for the multiple transactions and the points processor to deduct points for the multiple transactions.

17. A method for conducting a financial transaction using a funding device configured to automatically integrate points, the points being a non-fiat currency representation, into non-points credit transactions in a payment network for credit payments, the method comprising:
receiving at the funding device consumer pre-selected rules for the use of points in credit transactions involving a consumer's account, the consumer's account including both an associated credit account and an associated points account;
during a credit-based financial transaction from a merchant's POS terminal, receiving at the funding device information identifying the consumer's account transmitted from the POS terminal via the payment network;
determining, using the account identifying information, that the account includes an associated points account;
the funding device, based on the consumer pre-selected rules and without instructions regarding use of points being input at the POS terminal, communicating with a points processor to deduct points in a points transaction and with a credit processor to deduct credit in a modified credit transaction, a combined value of the modified credit transaction and the points transaction funding the financial transaction and causing an approval message for the financial transaction to be communicated to the POS terminal that is the same as an approval message for a credit transaction so that the POS terminal is not informed of the use of points in the financial transaction; and
the funding device causing a settlement payment to be provided to the merchant via the payment network for the financial transaction such that the financial transaction appears to the merchant as a regular credit card transaction.

18. The method of claim 17, further comprising:
prior to the transaction at the POS terminal, receiving from the consumer input to select the pre-selected rules for points via one of a smart phone, a computer, and a telephone call center.

19. The method of claim 18, wherein the pre-selected rules selected by the consumer are applicable to at least one of to all transactions, classes of transactions, or specific transactions of the consumer.

20. The method of claim 17, further comprising:
determining the financial transaction is to be paid at least partially by points according to the pre-selected rules;

determining whether the points account includes available points sufficient to cover all costs of the transaction; and responsive to the available points being insufficient to cover all costs of the transaction, partially funding the transaction by points and partially funding the transaction by credit.

21. The method of claim 17, wherein deducting points from the points account and/or credit from the credit account, as applicable, based on pre-selected rules occurs after providing the settlement payment to the merchant, the method further comprising:

conducting an original credit card transaction with the merchant; and modifying the original credit card transaction to create a new transaction based on the use of available credit and available points.

22. A payment system, comprising:

a payment network enabling a plurality of merchants to receive settlement payments from an issuer that issued a credit device to a consumer, the credit device allowing the consumer to make purchases from the plurality of merchants using funds from a credit account associated with the consumer;

a credit processor configured to manage and store information regarding credit available to the consumer from the credit account, the credit processor in communication with the merchants via the payment network;

a points processor configured to manage and store information regarding points that are available to the consumer, the points being a representation of a non-fiat currency; and a funding device in communication with the credit processor and the points processor, the funding device configured to access information regarding the credit available from the credit account by querying the credit processor, to access information regarding points available to the consumer by querying the points processor, to receive rules that were pre-selected by the consumer before the consumer begins a transaction with a first merchant of the plurality of merchants, to use the rules to determine use of the available credit and the available points for completing the transaction with the first merchant, and to determine whether the transaction is approved based at least on the available credit and the available points, and to communicate an approval to the credit processor when the transaction is approved;

the credit processor further configured, after receiving the approval from the funding device when the transaction is funded using points or a combination of credit and points, to communicate approval of the transaction to the first merchant with an approval message that is the same as an approval message used for a credit purchase via the payment network so that the transaction appears to the first merchant as a regular credit transaction when points or a combination of points and credit are used to pay for the transaction and the merchant is not informed that points were used to fund the transaction as part of the transaction approval.

* * * * *